United States Patent
Kitaguchi et al.

(10) Patent No.: US 10,265,881 B2
(45) Date of Patent: Apr. 23, 2019

(54) MANUFACTURING METHOD OF HONEYCOMB STRUCTURE

(71) Applicant: NGK INSULATORS, LTD., Nagoya (JP)

(72) Inventors: Daniel Yukichi Kitaguchi, Nagoya (JP); Toshihiro Fukui, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 151 days.

(21) Appl. No.: 15/434,390

(22) Filed: Feb. 16, 2017

(65) Prior Publication Data

US 2017/0274365 A1    Sep. 28, 2017

(30) Foreign Application Priority Data

Mar. 24, 2016   (JP) .................. 2016-060438

(51) Int. Cl.
| | | |
|---|---|---|
| *B28B 11/24* | (2006.01) | |
| *C04B 38/00* | (2006.01) | |
| *C04B 35/64* | (2006.01) | |
| *B01J 35/04* | (2006.01) | |
| *B01J 37/08* | (2006.01) | |
| *B28B 3/02* | (2006.01) | |
| *B28B 3/20* | (2006.01) | |

(52) U.S. Cl.
CPC ............. *B28B 11/243* (2013.01); *B01J 35/04* (2013.01); *B01J 37/08* (2013.01); *B28B 3/02* (2013.01); *B28B 3/20* (2013.01); *B28B 11/248* (2013.01); *C04B 35/64* (2013.01); *C04B 38/0006* (2013.01); *B28B 2003/203* (2013.01)

(58) Field of Classification Search
CPC .......................... B28B 11/243; C04B 38/0006
USPC ................. 264/671-673, 605-609, 630-631
See application file for complete search history.

(56) References Cited

U.S. PATENT DOCUMENTS

| | | | | |
|---|---|---|---|---|
| 3,904,352 A | * | 9/1975 | Thurnauer | ............... B65G 7/04 264/671 |
| 4,786,542 A | * | 11/1988 | Yasuda | ................... C04B 33/32 156/89.22 |
| 5,316,710 A | * | 5/1994 | Tasaki | ..................... C04B 35/64 264/630 |

(Continued)

FOREIGN PATENT DOCUMENTS

| | | | | |
|---|---|---|---|---|
| JP | | 62-202870 A | 9/1987 | |
| JP | | 03279267 A | * 12/1991 | ........... B28B 11/243 |

(Continued)

OTHER PUBLICATIONS

Japanese Office Action, Japanese Application No. 2016-060438, dated May 1, 2018 (4 pages).

*Primary Examiner* — Erin Snelting
(74) *Attorney, Agent, or Firm* — Burr & Brown, PLLC

(57) ABSTRACT

The manufacturing method of the honeycomb structure includes a mounting step of mounting an extruded honeycomb formed body on a firing setter disposed on a shelf plate, and a firing step of firing the honeycomb formed body mounted on the firing setter to form the honeycomb structure, and in the mounting step, the firing setter is used in which a value obtained by dividing an area of a formed body end face of the honeycomb formed body by an area of a honeycomb mounting surface of the firing setter which faces the formed body end face and at least a part of which comes in contact with the formed body end face is in a range of 2.5 to 20.0.

7 Claims, 4 Drawing Sheets

(56) References Cited

U.S. PATENT DOCUMENTS

| | | | |
|---|---|---|---|
| 7,517,379 B2* | 4/2009 | Sorensen, Jr. | B01D 46/0001 264/628 |
| 2006/0043652 A1* | 3/2006 | Saijo | F27D 3/12 264/671 |
| 2007/0264376 A1* | 11/2007 | Souda | B28B 11/243 425/110 |
| 2008/0116621 A1* | 5/2008 | Brennan | F27B 9/10 264/606 |
| 2008/0142149 A1* | 6/2008 | Noguchi | C04B 35/195 156/89.22 |
| 2008/0157445 A1* | 7/2008 | Kawai | F26B 25/003 264/671 |
| 2009/0200712 A1* | 8/2009 | Hayashi | B28B 11/241 264/630 |
| 2012/0013052 A1* | 1/2012 | Schumann | F27D 5/00 264/629 |
| 2015/0239785 A1* | 8/2015 | Ikeshita | C04B 38/0006 264/605 |
| 2016/0137558 A1* | 5/2016 | Watanabe | F27D 3/12 264/630 |

FOREIGN PATENT DOCUMENTS

| | | | |
|---|---|---|---|
| JP | H04-300252 | A | 10/1992 |
| JP | 2000-274954 | A1 | 10/2000 |
| JP | 2003-082403 | A1 | 3/2003 |
| JP | 2013-015398 | A | 1/2013 |

* cited by examiner

MANUFACTURING METHOD OF HONEYCOMB STRUCTURE

"The present application is an application based on JP-2016-060438 filed on Mar. 24, 2016 with Japan Patent Office, the entire contents of which are incorporated herein by reference."

BACKGROUND OF THE INVENTION

Field of the Invention

The present invention relates to a manufacturing method of a honeycomb structure, and more particularly, it relates to a manufacturing method of a honeycomb structure to be manufactured by laying a firing setter under an unfired honeycomb formed body and firing the honeycomb formed body.

Description of the Related Art

Heretofore, a honeycomb structures made of ceramics have been used in broad use applications of a car exhaust gas purifying catalyst carrier, a diesel particulate removing filter, a heat reservoir for a burning device and the like. The honeycomb structure made of ceramics (hereinafter referred to simply as "the honeycomb structure") is manufactured by preparing a forming material (a kneaded material), extruding the forming material into a desirable honeycomb shape by use of an extruder, and firing a rawly cut, dried and finish-cut honeycomb formed body at a high temperature through a firing step.

In the above firing step, the honeycomb formed body is mounted on a shelf plate in a state where one formed body end face is directed downward, and the honeycomb formed body is thrown together with the shelf plate into a firing furnace. At this time, for the purpose of preventing the honeycomb formed body from adhering to the shelf plate, a firing base plate called "a setter" is interposed between the shelf plate and the honeycomb formed body, to prevent the honeycomb formed body from coming in contact directly with the shelf plate. As the setter, for example, there is used a disc-like member obtained by cutting the honeycomb structure of the fired honeycomb formed body into a predetermined thickness. Furthermore, for the purpose of preventing the disadvantage that the setter is cracked due to its repeated use, there might be used a setter called "a pressed setter" obtained by press-molding a ceramics material and firing this material. These setters are generically defined as "a firing setter" in the present specification. Furthermore, a body subjected to extrusion prior to the firing is called "the honeycomb formed body" and the body fired through the firing step is called "the honeycomb structure".

The extruded honeycomb formed body is introduced into the firing furnace set at a predetermined firing temperature and the firing step is carried out. At this time, firing shrinkage is generated along a longitudinal direction (an axial direction) of the honeycomb formed body and a direction perpendicular to the longitudinal direction of cells. Therefore, in a case where the honeycomb formed body is mounted on the firing setter, a shift occurs between an upper surface of the firing setter (which corresponds to a honeycomb mounting surface) and a formed body end face of the honeycomb formed body due to the firing shrinkage during the firing, and defects such as "cell deformation" in the formed body and face and "partition wall crack" in which the partition walls are divided might occur.

Furthermore, when the formed body end face is stuck on the honeycomb mounting surface, the firing shrinkage is not uniformly performed and a shape of the formed body end face might be deformed. As a result, in the case of a round pillar-shaped honeycomb structure, there occurs a "roundness" defect indicating that the shape of the formed body end face does not become round. The above defects due to the use of the firing setter become remarkable especially in a case where a partition wall thickness of the partition walls defining a plurality of cells is small or in a case of firing a large honeycomb formed body having a large honeycomb diameter.

Especially, in the case of firing the honeycomb formed body having a small partition wall thickness, "a raw setter" is used which is obtained by cutting an unfired honeycomb formed body made of the same material as in the honeycomb formed body. The raw setter is made of the same material and therefore generates the same degree of firing shrinkage as in the honeycomb formed body, thereby avoiding the above problem that the honeycomb formed body is stuck on the honeycomb mounting surface of the raw setter, or the like. As a result, it is possible to suppress the possibility that the partition wall crack causes the roundness defect.

On the other hand, a setter (a firing base plate) has already been suggested which is capable of inhibiting the honeycomb formed body from being stuck on the honeycomb mounting surface of the firing setter which comes in contact with the honeycomb formed body and which is capable of minimizing a contact area (e.g., see Patent Document 1 or 2). In such a setter, the honeycomb mounting surface (the setter-upper surface) is flattened or is constituted of a curved surface rising from a side edge portion toward a central portion, thereby avoiding generation of resistance of firing shrinkage or binding between the honeycomb formed body and the firing setter in the firing step, and it is possible to manufacture the honeycomb structure without causing the cell deformation, the partition wall crack, and the like.

[Patent Document 1] JP-A-2000-274954
[Patent Document 2] JP-A-2003-82403

SUMMARY OF THE INVENTION

However, needless to say, "a raw setter" is usable only in one firing step. Therefore, the setter is not repeatedly usable as in a conventional firing setter, and there has been the problem that cost required in firing a honeycomb formed body increases. As a result, the use of the raw setter might be restricted depending on a type of honeycomb structure to be manufactured. Furthermore, the raw setter is not fired yet and is easy to be deformed, and hence it is necessary to treat the raw setter more carefully than the firing setter. Operation burdens on an operator might increase and problems might occur in terms of an operation efficiency.

Furthermore, also in a case where setters disclosed in Patent Documents 1 and 2 are used, cell deformation, partition wall crack and the like still occur in the fired honeycomb structure. Especially, in the case of a large honeycomb structure having a large honeycomb diameter, it is difficult to adjust firing conditions during firing and there is the tendency that the occurrence of defect increases.

To eliminate such a problem, the present invention has been developed in view of the above circumstances, and an object thereof is to provide a manufacturing method of a honeycomb structure in which a firing setter is used without causing defects such as cell deformation and partition wall crack.

According to the present invention, there is provided a manufacturing method of a honeycomb structure which achieves the above object.

According to a first aspect of the present invention, a manufacturing method of a honeycomb structure is provided including a mounting step of mounting an extruded honeycomb formed body on a firing setter disposed on a shelf plate, and a firing step of firing the honeycomb formed body mounted on the firing setter to form the honeycomb structure, wherein in the mounting step, the firing setter is used in which a value obtained by dividing an area of a formed body end face of the honeycomb formed body by an area of a honeycomb mounting surface of the firing setter which faces the formed body end face and at least a part of which comes in contact with the formed body end face is in a range of 2.5 to 20.0.

According to a second aspect of the present invention, the manufacturing method of the honeycomb structure according to the above first aspect is provided, wherein the honeycomb structure formed by the firing step includes a dented portion which is dented in a concave state by the contact with the firing setter, and a height from a structure end face of the honeycomb structure to the deepest portion of the dented portion is 3.0 mm or less.

According to a third aspect of the present invention, the manufacturing method of the honeycomb structure according to the above second aspect is provided, further including an end face grinding step of grinding the structure end face of the honeycomb structure.

According to a fourth aspect of the present invention, the manufacturing method of the honeycomb structure according to any one of the above first to third aspects is provided, wherein as the firing setter, a pressed setter made of ceramics is used.

According to a fifth aspect of the present invention, the manufacturing method of the honeycomb structure according to any one of the above first to fourth aspects is provided, wherein the honeycomb mounting surface of the firing setter has a curved surface portion formed of a convex curved surface, and a height from an outer edge portion of the curved surface portion to a topmost portion thereof is in a range of 0.2 mm to 0.9 mm.

According to a sixth aspect of the present invention, the manufacturing method of the honeycomb structure according to any one of the above first to fifth aspects is provided, wherein the firing setter possesses a round sectional shape.

According to a seventh aspect of the present invention, the manufacturing method of the honeycomb structure according to any one of the above first to sixth aspects is provided, wherein a surface roughness of the honeycomb mounting surface is 10 μm or less.

According to a manufacturing method of a honeycomb structure of the present invention, it is possible to fire a honeycomb formed body without causing defects such as cell deformation and partition wall crack, thereby manufacturing the honeycomb structure. Especially, it is possible to inhibit the increase of manufacturing cost as in a case where a raw setter is used, and it is possible to prevent deterioration of yield during the manufacturing of the honeycomb structure.

DESCRIPTION OF THE PREFERRED EMBODIMENTS

Hereinafter, an embodiment of a manufacturing method of a honeycomb structure of the present invention will be described in detail with reference to the drawings. It is to be noted that the manufacturing method of the honeycomb structure of the present invention is not limited to the following embodiment, and various design changes, modifications, improvements and others are addable without departing from the gist of the present invention.

Figure 1:
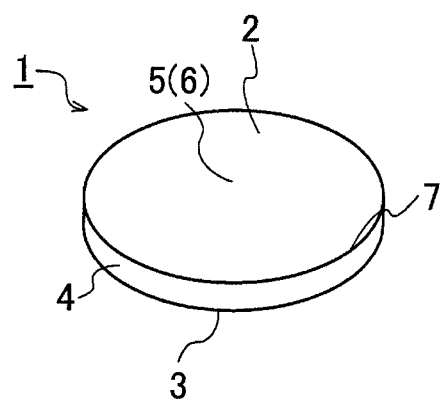
FIG. 1 is a perspective view showing a schematic constitution of a firing setter for use in a manufacturing method of a honeycomb structure of the present invention.
Figure 2:
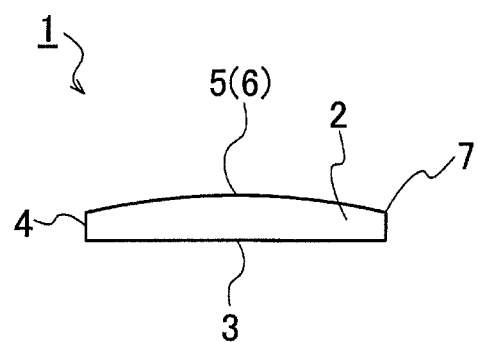
FIG. 2 is a front view showing a schematic constitution of the firing setter.
Figure 3:
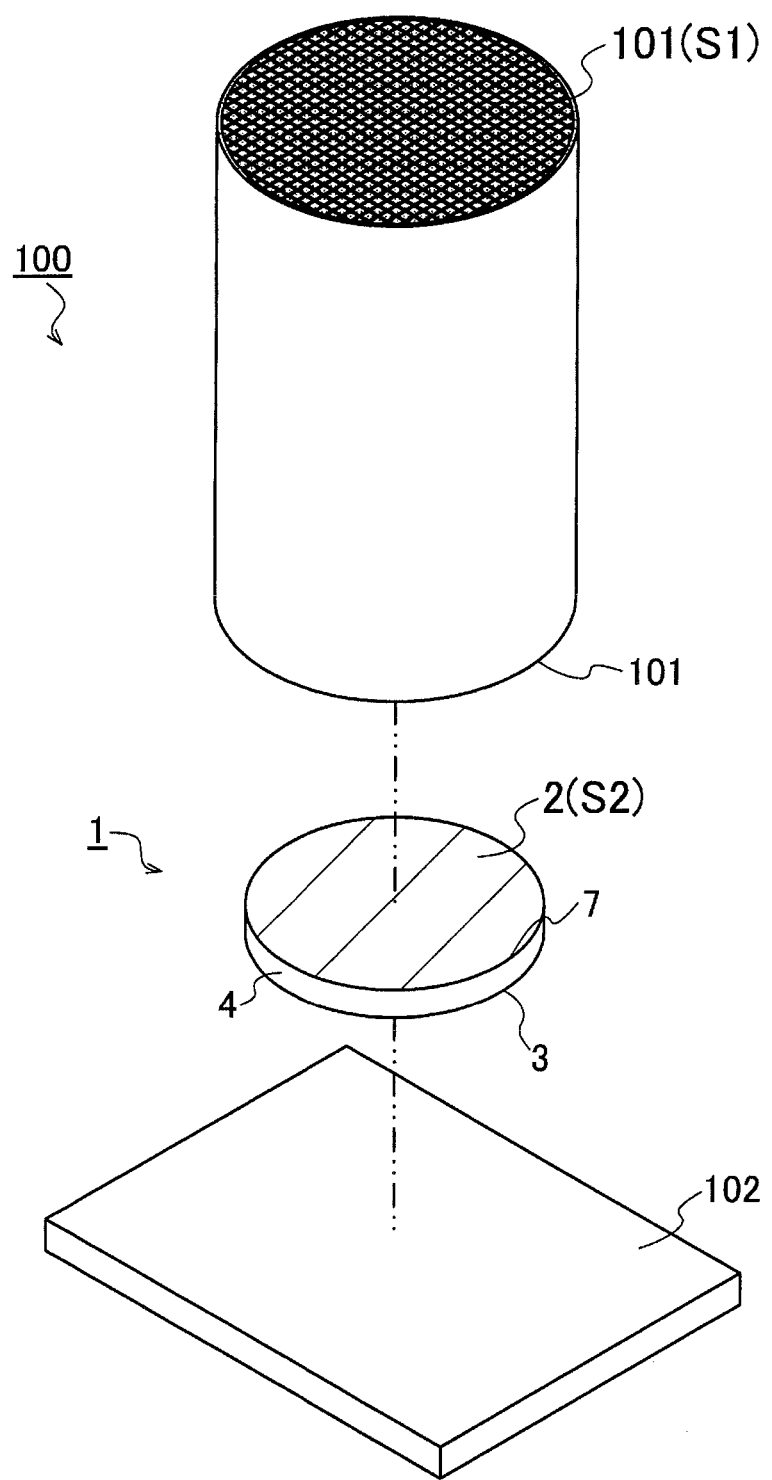
FIG. 3 is an exploded perspective view showing a honeycomb formed body before fired, the firing setter, and a shelf plate.

The manufacturing method of the honeycomb structure of one embodiment of the present invention includes a mounting step of directing a formed body end face 101 of an extruded honeycomb formed body 100 downward and mounting the honeycomb formed body on a firing setter 1 disposed on a shelf plate 102, and a firing step of introducing the honeycomb formed body 100 uprightly mounted on the firing setter 1 into a firing furnace (not shown) and firing the honeycomb formed body on predetermined firing conditions, thereby manufacturing a honeycomb structure 103 (see FIG. 3 and the like).

Here, as shown in FIG. 1 to FIG. 5, the firing setter 1 for use in the above mounting step and firing step of the manufacturing method of the honeycomb structure possesses a substantially round pillar shape, and on an upper surface side, there is disposed a honeycomb mounting surface 2 which possesses a substantially round pillar shape and has a round sectional shape and faces the formed body end face 101 of the honeycomb formed body 100 of a firing target and at least a part of which comes in contact with the formed body end face 101, and on a lower surface side opposite to the honeycomb mounting surface 2, a setter lower surface 3 which comes in contact with the shelf plate 102 is disposed.

The honeycomb mounting surface 2 has a curved surface portion 6 formed of a convex curved surface rising from a side edge portion 4 of the firing setter 1 toward a topmost portion 5 thereof. It is to be noted that a diameter D2 of the round honeycomb mounting surface 2 of the firing setter 1 is adjusted to be smaller than a diameter D1 (corresponding to a honeycomb diameter) of the formed body end face 101 of the honeycomb formed body 100 to be mounted (D1>D2).

Furthermore, in the firing setter 1, an area ratio is stipulated between the honeycomb mounting surface 2 and the formed body end face 101 of the honeycomb formed body 100 to be mounted. Specifically, it is set that a value obtained by dividing an area $S1$ $(=(D1/2)^2 \times \pi)$ of the round formed body end face 101 by an area $S2$ $(=(D2/2)^2 \times \pi)$ of the honeycomb mounting surface 2 of the firing setter 1 is preferably in a range of 2.5 to 20.0 and more preferably in a range of 3.0 to 14.0. Consequently, the area ratio (=S1/S2)

between the honeycomb formed body 100 and the firing setter 1 is stipulated (see FIG. 3).

That is, the area S1 of the formed body end face 101 is limited to a range of 2.5 times to 20.0 times as large as the area S2 of the honeycomb mounting surface 2. Here, the above area ratio can be calculated from the respective diameters D1 and D2 because the formed body end face 101 and the honeycomb mounting surface 2 have a round shape. However, the shape of the formed body end face 101 and the honeycomb mounting surface 2 is not limited to the round shape. For example, in a case where the honeycomb formed body and the firing setter are formed as polygonal pillar-shaped bodies, respectively, the formed body end face and the honeycomb mounting surface have a polygonal shape. In this case, on the basis of the respective areas of the polygonal formed body end face and honeycomb mounting surface, the above area ratio may be calculated so that a calculated value is in the above stipulated range.

Furthermore, it has been illustrated that the firing setter 1 for use in the manufacturing method of the honeycomb structure of the present embodiment has the curved surface portion 6 formed of the convex curved surface in the honeycomb mounting surface 2, but the present invention is not limited to this example, and the honeycomb mounting surface may be formed of, for example, a flat honeycomb mounting surface which does not have the curved surface portion. In this case, a contact area with the formed body end face 101 may increase as long as the above stipulated area ratio is satisfied.

Furthermore, in the curved surface portion 6 of the honeycomb mounting surface 2 of the firing setter 1, a height H3 from a curved surface portion outer edge 7 of the curved surface portion 6 to the topmost portion 5 thereof is set to a range of 0.2 mm to 0.9 mm. It is to be noted that the whole height (thickness) of the firing setter 1 is defined as a height H2 (see FIG. 4). That is, in a case where the honeycomb formed body 100 is mounted on the firing setter 1, the formed body end face 101 of the honeycomb formed body 100 is mounted in a state where a clearance is made as much as at least the height H2 of the firing setter 1 from an upper surface of the shelf plate 102. Furthermore, due to the curved surface portion 6 of the honeycomb mounting surface 2, the contact area between the formed body end face 101 and the curved surface portion 6 decreases. At this time, it is necessary to dispose the honeycomb formed body so that a central portion of the honeycomb mounting surface 2 of the firing setter 1 matches a central portion of the formed body end face 101 of the honeycomb formed body 100.

Figure 6:
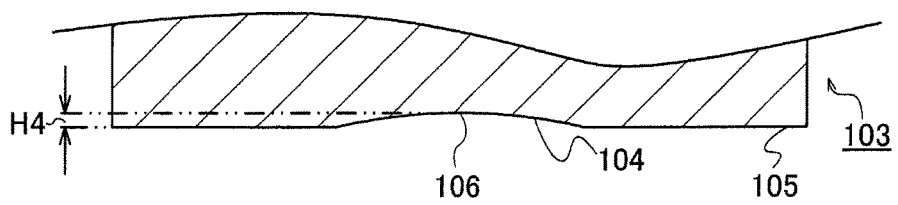
FIG. 6 is a partially enlarged cross-sectional view showing a structure end face of the fired honeycomb structure as seen from the side.

Furthermore, in the manufacturing method of the honeycomb structure of the present embodiment, the honeycomb structure 103 formed by the firing step includes a dented portion 104 which is dented in a concave state by the contact with the firing setter 1. Furthermore, a height H4 from a structure end face 105 of the honeycomb structure 103 to the deepest portion 106 of the dented portion 104 is set to a range of 0.2 mm and smaller than 0.9 mm (see FIG. 6). As described above, the area S2 of the honeycomb mounting surface 2 of the firing setter 1 on which the honeycomb formed body is mounted is smaller than the area S1 of the formed body end face 101 of the honeycomb formed body 100 of the firing target, and the area ratio is set to a range of 2.5 to 20.0. Therefore, in a case where the honeycomb formed body 100 which is not fired yet is mounted on the firing setter 1, due to a self-weight of the honeycomb formed body 100, a part of the firing setter 1 is buried in the honeycomb formed body 100, and the dented portion 104 is formed as described above (see FIG. 5). The height H4 from the structure end face 105 of the dented portion 104 to the deepest portion 106 thereof is set to the above range.

Furthermore, the manufacturing method of the honeycomb structure of the present embodiment may further include an end face grinding step of grinding the structure end face 105 of the fired honeycomb structure 103. In consequence, the dented portion 104 generated in the structure end face 105 by the firing step can be removed by an end face grinding operation. At this time, an amount of the structure end face to be ground by the end face grinding step is set to at least the height H4 from the structure end face 105 to the deepest portion 106. Therefore, an extrusion is performed to adjust a length of the honeycomb formed body 100 in an axial direction in consideration of the amount of the structure end face to be ground.

The firing setter 1 is made of a ceramics material. There is not any special restriction on the material, and for example, various materials heretofore used as the material of the firing setter are usable. For example, it is possible to use a material which is fired at a high temperature to be converted into a cordierite, silicon carbide or alumina material. It is to be noted that as the firing setter 1 of the present embodiment, a heretofore well-known mullite material is used.

Additionally, there is not any special restriction on a method of forming the firing setter 1. For example, the usual disc-like firing setter is formed, and then the honeycomb mounting surface of the firing setter is subjected to grind processing or the like in accordance with a shape of the convex curved surface, so that the firing setter of a desirable shape is obtainable. However, the number of the firing setters for use in the firing step is large, and there is the fear that the subjecting of the respective firing setters to the above grind processing leads to complication of manufacturing steps of the firing setter and increase of manufacturing cost.

Therefore, for example, the firing setter may be manufactured by using a molding die for press molding which is formed in accordance with the shape of the firing setter, charging a ceramics material as a raw material into the molding die, and applying a desirable pressing pressure to the die, thereby forming the firing setter. The firing setter can be manufactured by applying the pressing pressure and then firing a setter formed body molded from the molding die. Consequently, a large number of pressed setters made of ceramics can be produced and are usable as the firing setters of the present invention.

Furthermore, the firing setter 1 is set so that a surface roughness (Ra) of the honeycomb mounting surface 2 is 10 µm or less. Here, the surface roughness (Ra) is a value measured on the basis of a measurement method described in JIS-B-0601. The honeycomb mounting surface 2 (the curved surface portion 6) is a region which comes in contact directly with the formed body end face 101 of the honeycomb formed body 100, and presence/absence of fine unevenness on the honeycomb mounting surface 2, i.e., smoothness of the honeycomb mounting surface 2 especially has an influence when the formed body end face 101 is stuck on the firing setter 1, uniform firing shrinkage is obstructed and a defect such as cell deformation occurs. When the surface roughness (Ra) of the honeycomb mounting surface 2 is stipulated at the above numeric value or less, it is possible to effectively avoid the occurrence of the defect during the firing.

Figure 4:
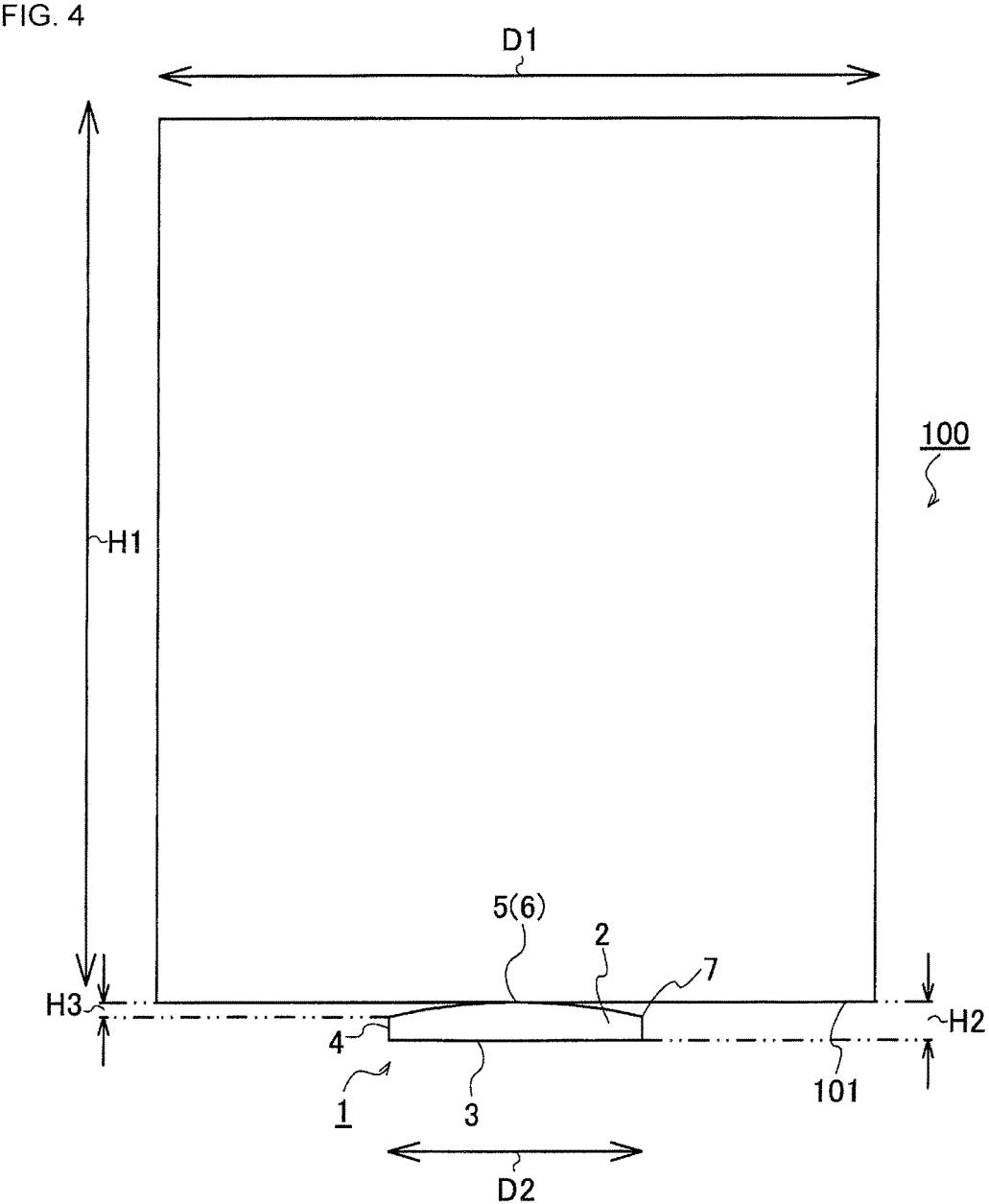
FIG. 4 is an explanatory view showing a state where the honeycomb formed body is mounted on the firing setter as seen from a side.
Figure 5:
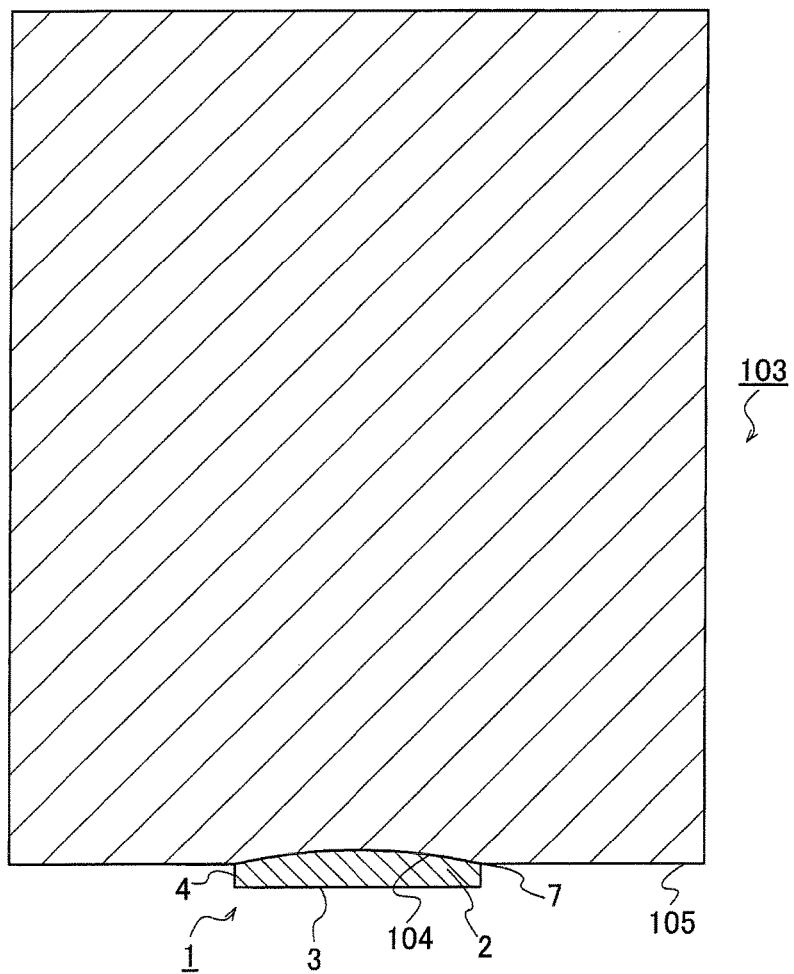
FIG. 5 is a cross-sectional view showing the firing setter and the honeycomb structure after fired as seen from the side.

The firing setter 1 having the above constitution is mounted on the shelf plate 102, and furthermore, at least a part of the formed body end face 101 of the honeycomb formed body 100 is brought into contact with the honeycomb mounting surface 2, so that the substantially round pillar-shaped honeycomb formed body 100 can be mounted in an upright state (FIG. 3 and FIG. 4).

Especially, when stipulating the range of the area ratio (=S1/S2) between the area S1 of the formed body end face 101 of the honeycomb formed body 100 and the area S2 of the honeycomb mounting surface 2 of the firing setter 1, it is possible to decrease the contact area with the formed body end face 101 as much as possible. Furthermore, when suppressing the surface roughness (Ra) of the honeycomb mounting surface 2 to 10 μm or less, it is possible to prevent the formed body end face 101 from being stuck during the generation of the firing shrinkage. As a result, occurrence of defects such as cell deformation and partition wall crack is eliminated, uniform firing shrinkage is performed, and roundness defect in the formed body end face 101 does not occur.

Hereinafter, the manufacturing method of the honeycomb structure of the present invention will be described on the basis of the following examples, but the manufacturing method of the honeycomb structure of the present invention is not limited to these examples.

EXAMPLES (1) Honeycomb Formed Body

Honeycomb formed bodies of firing targets were used in which a diameter D1 (a honeycomb diameter) was in a range of 191 mm to 356 mm and a length H1 in an axial direction was 152 mm (Examples 1 and 4) or 203 mm (the other examples and Comparative Examples 1 to 6).

(2) Firing Setter

Firing setters of Examples 1 to 9 were used in which a diameter D2 was in a range of 88 mm to 147 mm, a height H2 of the firing setter was 8 mm, and a height H3 from an outer edge portion to a topmost portion was in a range of 0.22 mm to 0.87 mm. On the other hand, firing setters of Comparative Examples 1 to 6 were used in which a diameter D2 was in a range of 68 to 356 mm, a height H2 of the firing setter was 8 mm or 17 mm, and a height H3 from an outer edge portion to a topmost portion was in a range of 0.10 mm to 0.42 mm. These setters were all pressed setters and a material of the setters was a mullite material.

(3) Performing of Firing Step

Respective combinations of the honeycomb formed bodies and the firing setters of Examples 1 to 9 and Comparative Examples 1 to 5 described above were used, and firing conditions including a firing temperature and the like were set to be the same, thereby performing respective firing steps. In each honeycomb structure obtained by firing, there were evaluated a height H4 from a structure end face to the deepest portion of a dented portion and presence/absence of partition wall crack in the structure end face.

(4) Evaluation of Height H4 to Deepest Portion of Dented Portion and Structure End Face The example where the height H4 from the structure end face to the deepest portion of the dented portion was smaller than 2.0 mm was evaluated as "A", the example where the height was in a range of 2.0 mm to 3.0 mm was evaluated as "B", and the example where the partition wall crack of 3.0 mm or more was confirmed or the partition wall crack was visually confirmed was evaluated as "C".

Table 1 shows evaluation results of respective specifications and area ratios of the honeycomb formed bodies and the firing setters, each height H4 of the dented portion and the structure end faces in the respective combinations of the honeycomb formed bodies and the firing setters of Examples 1 to 9 and Comparative Examples 1 to 6.

TABLE 1

|  | Honeycomb formed body | | Firing setter | | | Honeycomb formed body/firing setter ratio | Deformation degree of honeycomb structure |
| --- | --- | --- | --- | --- | --- | --- | --- |
|  | D1/mm | H1/mm | D2/mm | H2/mm | H3/mm | D1/D2 area ratio | H4 |
| Example 1 | 191 | 152 | 88 | 8 | 0.70 | 4.7 | A |
| Example 2 | 267 | 203 | 115 | 8 | 0.58 | 5.4 | A |
| Example 3 | 267 | 203 | 147 | 8 | 0.35 | 3.3 | A |
| Example 4 | 330 | 152 | 115 | 8 | 0.60 | 8.2 | A |
| Example 5 | 330 | 203 | 88 | 8 | 0.87 | 14.1 | B |
| Example 6 | 330 | 203 | 115 | 8 | 0.53 | 8.2 | A |
| Example 7 | 330 | 203 | 147 | 8 | 0.22 | 5.0 | A |
| Example 8 | 356 | 203 | 88 | 8 | 0.67 | 16.4 | B |
| Example 9 | 356 | 203 | 115 | 8 | 0.51 | 9.6 | A |
| Comparative Example 1 | 267 | 203 | 191 | 8 | 0.28 | 2.0 | C |
| Comparative Example 2 | 267 | 203 | 250 | 8 | 0.18 | 1.1 | C |
| Comparative Example 3 | 330 | 203 | 250 | 8 | 0.33 | 1.7 | C |
| Comparative Example 4 | 356 | 203 | 250 | 8 | 0.15 | 2.0 | C |
| Comparative Example 5 | 356 | 203 | 356 | 17 | 0.10 | 1.0 | C |
| Comparative Example 6 | 330 | 203 | 68 | 17 | 0.42 | 23.6 | C |

As shown in Table 1 described above, in a case where a value obtained by dividing an area S1 of a formed body end face of each honeycomb formed body by an area S2 of a honeycomb mounting surface of each firing setter was in a range of 2.5 to 20.0 as shown in Examples 1 to 9, it was confirmed that a deformation degree of the honeycomb structure decreased, and the height H4 to the deepest portion of the dented portion decreased to be smaller than 3.0 mm. Furthermore, in a case where the above area ratio (=S1/S2) was 14.0 or less, the example obtained the evaluation "A". On the other hand, in a case where the area ratio deviated from the above range (see Comparative Examples 1 to 6), the height H4 was 3.0 mm or more and a defect such as the occurrence of the partition wall crack was recognized in the structure end face.

A manufacturing method of a honeycomb structure of the present invention is suitably usable in manufacturing a honeycomb structure which is utilizable in a car exhaust gas purifying catalyst carrier, a diesel particulate removing filter, a heat reservoir for a burning device, or the like.

DESCRIPTION OF REFERENCE NUMERALS

1: firing setter, 2: honeycomb mounting surface, 3: setter lower surface, 4: side edge portion, 5: topmost portion, 6: curved surface portion, 7: curved surface portion outer edge, 100: honeycomb formed body, 101: formed body end face, 102: shelf plate, 103: honeycomb structure, 104: dented portion, 105: structure end face, 106: deepest portion, D1: diameter of the formed body end face, D2: diameter of the honeycomb mounting surface, H1: length of the honeycomb formed body in an axial direction, H2: height of the firing setter, H3: height from the curved surface portion outer edge to the topmost portion, H4: height to the deepest portion of the dented portion, S1: area of the formed body end face, and S2: area of the honeycomb mounting surface.

What is claimed is:

1. A manufacturing method of a honeycomb structure comprising:
   a mounting step of mounting an extruded honeycomb formed body on a firing setter disposed on a shelf plate; and
   a firing step of firing the honeycomb formed body mounted on the firing setter to form the honeycomb structure,
   wherein in the mounting step, the firing setter is used in which a value obtained by dividing an entire area of a formed body end face of the honeycomb formed body by an entire area of a honeycomb mounting surface of the firing setter which faces the formed body end face and at least a part of which comes in contact with the formed body end face is in a range of 2.5 to 20.0.

2. The manufacturing method of the honeycomb structure according to claim 1,
   wherein the honeycomb structure formed by the firing step comprises a dented portion which is dented in a concave state by the contact with the firing setter, and
   a height from a structure end face of the honeycomb structure to the deepest portion of the dented portion is 3.0 mm or less.

3. The manufacturing method of the honeycomb structure according to claim 2,
   further comprising an end face grinding step of grinding the structure end face of the honeycomb structure.

4. The manufacturing method of the honeycomb structure according to claim 1,
   wherein as the firing setter, a pressed setter made of ceramics is used.

5. The manufacturing method of the honeycomb structure according to claim 1,
   wherein the honeycomb mounting surface of the firing setter has a curved surface portion formed of a convex curved surface, and
   a height from an outer edge portion of the curved surface portion to a topmost portion thereof is in a range of 0.2 mm to 0.9 mm.

6. The manufacturing method of the honeycomb structure according to claim 1,
   wherein the firing setter possesses a round sectional shape.

7. The manufacturing method of the honeycomb structure according to claim 1,
   wherein a surface roughness of the honeycomb mounting surface is 10 μm or less.

* * * * *